(12) United States Patent
Bower

(10) Patent No.: US 9,273,402 B2
(45) Date of Patent: Mar. 1, 2016

(54) SYSTEM AND METHOD FOR THE MANUFACTURE, STORAGE AND TRANSPORTATION OF HYDROGEN AND OXYGEN GAS

(71) Applicant: Joseph P. Bower, Morgantown, WV (US)

(72) Inventor: Joseph P. Bower, Morgantown, WV (US)

( * ) Notice: Subject to any disclaimer, the term of this patent is extended or adjusted under 35 U.S.C. 154(b) by 0 days.

(21) Appl. No.: 14/415,756

(22) PCT Filed: Jul. 10, 2014

(86) PCT No.: PCT/US2014/046095
§ 371 (c)(1),
(2) Date: Jan. 20, 2015

(87) PCT Pub. No.: WO2015/163932
PCT Pub. Date: Oct. 29, 2015

(65) Prior Publication Data
US 2016/0010220 A1    Jan. 14, 2016

(51) Int. Cl.
*C25B 1/12*          (2006.01)
(52) U.S. Cl.
CPC ........................................ *C25B 1/12* (2013.01)
(58) Field of Classification Search
CPC ........................................................ C25B 1/12
See application file for complete search history.

(56) References Cited

U.S. PATENT DOCUMENTS

| | | | |
|---|---|---|---|
| 6,692,621 B1 * | 2/2004 | Chancellor | ............... C25B 1/04 204/266 |
| 7,628,017 B2 | 12/2009 | Montesinos | |
| 7,911,071 B2 | 3/2011 | Devine | |
| 8,196,405 B2 | 6/2012 | Wolf | |
| 8,203,225 B2 | 6/2012 | Devine | |
| 8,415,814 B2 | 4/2013 | Devine | |
| 8,575,770 B2 | 11/2013 | Devine | |
| 2002/0145288 A1 | 10/2002 | Van Breems | |
| 2006/0011472 A1 * | 1/2006 | Flick | ......................... C25B 1/12 204/276 |
| 2010/0089766 A1 | 4/2010 | Menear | |
| 2012/0137950 A1 | 6/2012 | Rapp et al. | |
| 2012/0222953 A1 * | 9/2012 | Anderson | ................. C25B 1/12 204/229.8 |

FOREIGN PATENT DOCUMENTS

| | | | | |
|---|---|---|---|---|
| EP | 2653773 A1 * | 10/2013 | ............. | B63B 35/44 |
| GB | 2504568 A * | 2/2014 | ................ | F02C 3/22 |

* cited by examiner

*Primary Examiner* — Nicholas A Smith
(74) *Attorney, Agent, or Firm* — Carothers and Carothers

(57) ABSTRACT

A system for the manufacture, storage and transportation of hydrogen and oxygen gas wherein deep sealed production chambers (10) capable of withstanding high pressures are provided and water is fed by gravity from a water source to the bottom of the deep sealed production chamber (10) thereby producing water(16) in the bottom of the production chamber (10) under substantial pressure. Hydrogen and oxygen gas are produced in the water at the bottom of the production chamber (10) with electrolysis and the produced oxygen is captured in an oxygen escape pipe (18) extending from the bottom of the production chamber (10) to the exterior (19) of the production chamber (10), the oxygen escape pipe (18) containing a positive anode electrode (25) for the electrolysis in the bottom end of the oxygen pipe. The hydrogen gas is collected under pressure at the upper storage area (22) of the production chamber (10).

9 Claims, 7 Drawing Sheets

SYSTEM AND METHOD FOR THE MANUFACTURE, STORAGE AND TRANSPORTATION OF HYDROGEN AND OXYGEN GAS

CROSS REFERENCE

This application claims the benefit of U.S. Provisional Patent Application No. 61/981,872, filed on Apr. 21, 2014, for APPARATUS AND METHOD FOR THE MANUFACTURE, STORAGE AND TRANSPORTATION OF HYDROGEN AND OXYGEN GAS, the contents of which are incorporated herein in their entirety.

BACKGROUND OF THE INVENTION

One of the main problems with green energies, such as wind and solar, is that they do not generate electricity when the wind is not blowing and the sun is not shining. Another problem with these two systems and hydroelectric generation is that there is presently no way to economically store electrical energy when there is a surplus of energy created by these methods.

It is a principal object of the method and apparatus of the present invention to provide an efficient and inexpensive way to use electricity, from any source, and convert it to hydrogen and oxygen gases. In these forms the potential energy of electricity can be stored and transported for many different reasons, such as the generation of electricity and powering moving vehicles. The process uses a known procedure of electrolysis to break water into hydrogen gas and oxygen gas. Once the infrastructure of the present invention is in place, it is able to store large quantities of hydrogen (and oxygen if desired), under high pressures without the need for compressors. It can also provide constant high pressures to initiate the transportation of the hydrogen gas from the storage area through pipeline without compressors.

SUMMARY OF THE INVENTION

The system and method of the present invention provides the manufacture, storage and transportation of hydrogen and oxygen gas under pressure. Deep sealed production chambers capable of withstanding high pressures are provided and a water source feed pipe is provided which extends from a source of water under hydrostatic pressure to the bottom of the production chamber for thereby supplying water by gravity flow to the bottom of the production chamber. Due to the difference in elevation between the surface of the water source and the bottom of the production chamber, water under high pressure is provided at the bottom of the production chamber.

An oxygen escape pipe extends from the exterior of the production chamber to the bottom of the production chamber for exhausting oxygen under pressure from the bottom of the production chamber. An electrolyzing device is positioned at the bottom of the production chamber for producing hydrogen and oxygen gas under pressure and the oxygen escape pipe is provided with a positive anode electrode of the electrolyzing device therein at the bottom of the pipe for generating oxygen in the pipe with the electrolyzing device.

The production chamber should be capable of withstanding pressures in excess of 500 psi, and in order to provide sufficient hydrostatic water pressure at the bottom of the production chamber, the production chamber should be at least 100 feet deep.

The production chamber may be constructed as an underground pit which is bored into the earth or is already provided in the earth, such as by a mine shaft, which is sealed off at the top in order to provide a production chamber which will withstand sufficient pressures The water source may be a nearby ocean, lake or river.

In an alternative embodiment, the hydrogen pipe may extend from the bottom of the production chamber to the top of the production chamber, and the hydrogen pipe contains a negative cathode electrode of the electrolyzing device at its bottom end for thereby generating the hydrogen gas within the hydrogen pipe. In this manner, the generated hydrogen upon rising to the upper storage area of the production chamber does not have an opportunity to interact excessively with surrounding water in the production chamber.

In yet another embodiment of the present invention, the production chamber includes an intermediate floating pressure seal which segregates the top and bottom portions of the production chamber. This is a floating seal within the production chamber is used to separate the pressurized hydrogen gas storage area from the water in the lower section of the production chamber. This liquid/gas floating seal will rise and fall with the water level as more hydrogen is either accumulated or taken out of the production chamber. This minimizes the reaction between the generated hydrogen gas and the water in the production chamber.

The electrolyzing device is preferably powered from solar panels or windmill generators so that when the amount of electricity produced by these methods exceeds demand, the excess electricity will be directed to the hydrogen and oxygen production chambers.

As the hydrogen gas is manufactured and stored, the pressure of the trapped gases in the production chamber will force water back into the water source, such as the lake, river or ocean, thereby maintaining the captured hydrogen under constant pressure.

When demand for electricity increases, the system of the present invention can be connected to a power plant facility to produce electricity by combusting the produced hydrogen and oxygen to assist in meeting the demand.

Additional deep sealed storage chambers may be connected to the production chamber for storing the hydrogen or oxygen generated in the production chamber under pressure. These additional storage chambers preferably also include a water source feed pipe extending from the water source to the bottom portion of the storage chamber or chambers to also maintain high pressure in the storage chamber or chambers.

The waste product of the system of the present invention is clean water which flows by gravity back into the water source, be it a lake, river or ocean. In the system of the present invention there is no requirement for pumps to move the water in and out of the hydrogen and oxygen production and storage chambers, and there is no need for compressors to pressurize and move the hydrogen and oxygen gases from the storage structures to the power plant or another consuming use.

BRIEF DESCRIPTION OF THE DRAWINGS

Other objects and advantages appear hereinafter in the following description and claims. The accompanying drawings show, for the purpose of exemplification, without limiting the scope of the invention or the appended claims, certain practical embodiments of the present invention wherein:

DETAILED DESCRIPTION OF THE PREFERRED EMBODIMENTS

Figure 1:
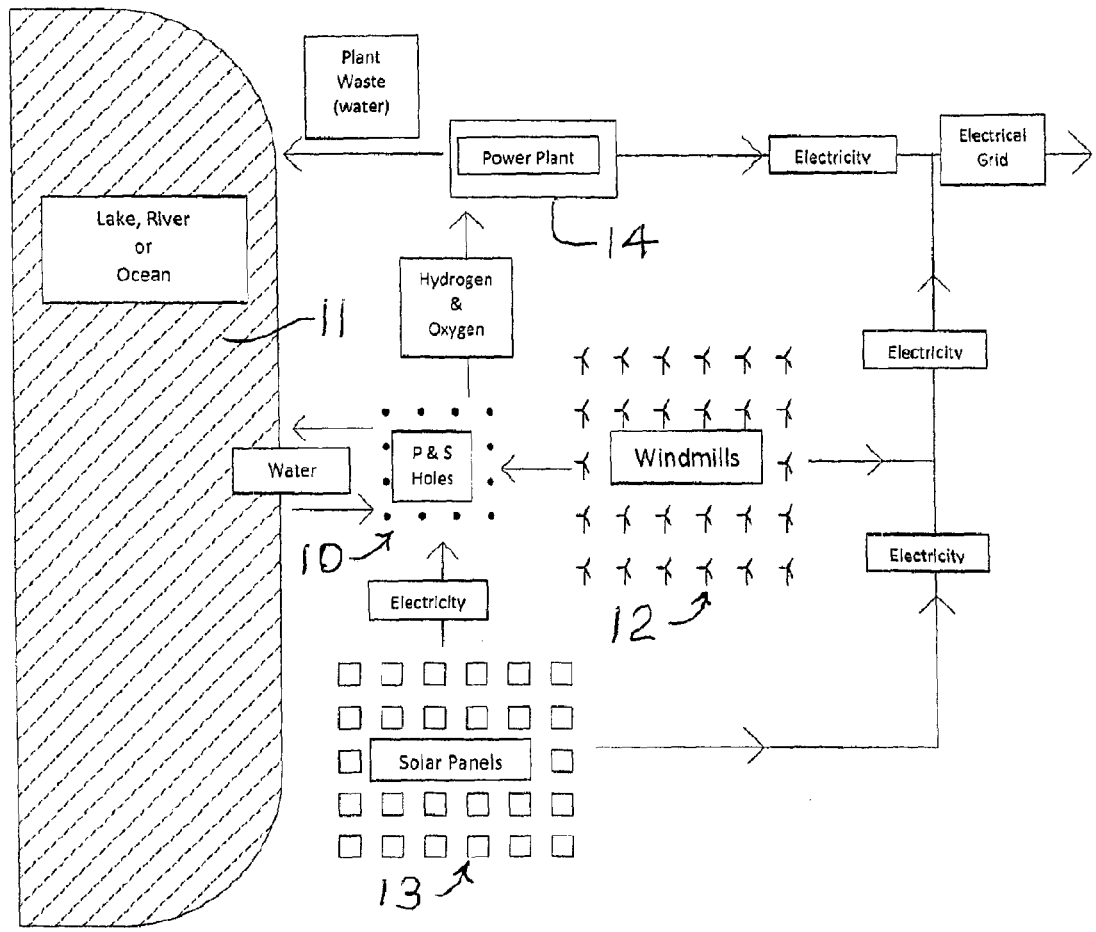
FIG. 1 is a schematic diagram of the system layout of the present invention for the manufacture, storage and transportation of hydrogen and oxygen gas under pressure in accordance with the teachings of the present invention.

Referring to FIG. 1, a schematic drawing is shown which illustrates the entire system layout for the system of the present invention for manufacturing, storing and transporting hydrogen and oxygen gas. The system of the present invention includes deep sealed production and storage chambers 10 which are capable of withstanding high pressures, or pressures in excess of 500 psi. The chambers 10 are indicated in the figure as P&S Holes for production and storage holes or chambers.

Water is fed from an adjacent source of water 11, which may be for example, a lake, river or the ocean, to and from the sealed production and storage chambers 10, and during low demand periods hydrogen and oxygen gas are generated in the bottom of the sealed pressurized production chambers 10 with the use of an electrolyzing device in the bottom of the production chambers 10 which are energized from electricity produced from the wind mills 12 and the solar panels 13.

The hydrogen and oxygen gases stored within the production chambers and the storage chambers 10 may be fed independently to power plant 14 at peak demand times where the hydrogen and oxygen are burned to produce supplemental electricity which is fed to the electrical grid.

Figure 2:
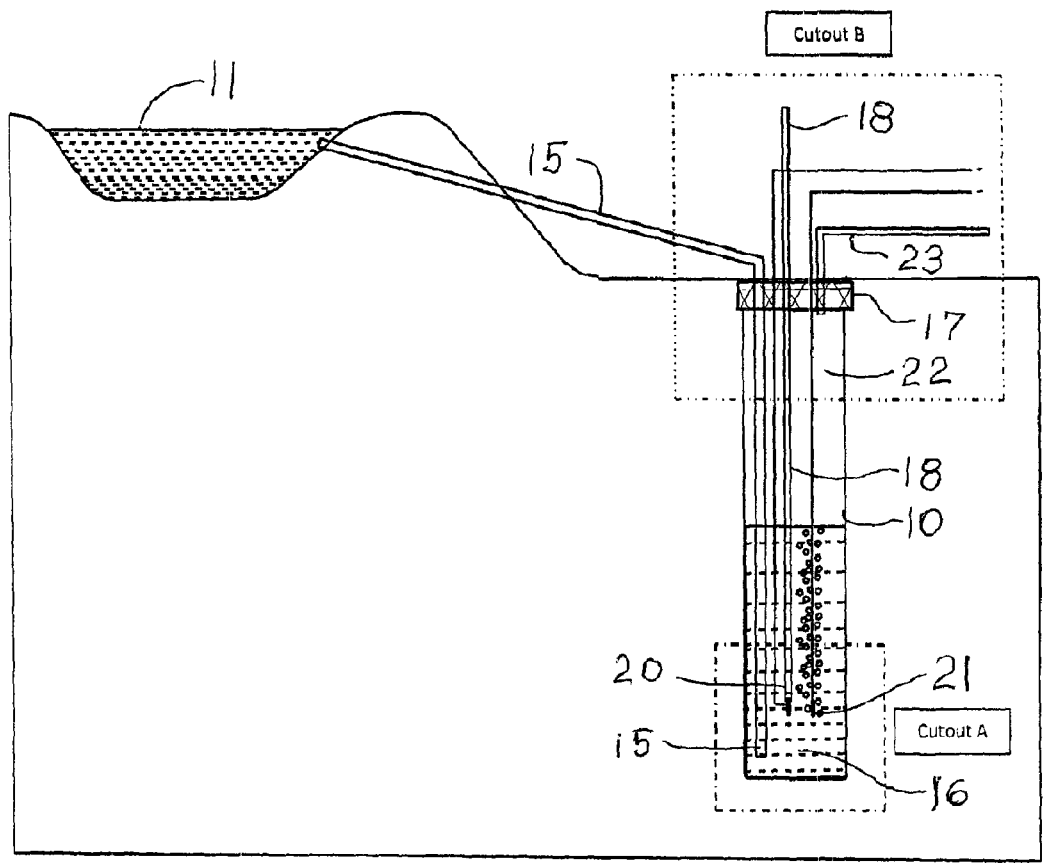
FIG. 2 is a schematic diagram illustrating a basic embodiment of the system of the present invention for the manufacture, storage and transportation of hydrogen and oxygen gas.
Figure 3:
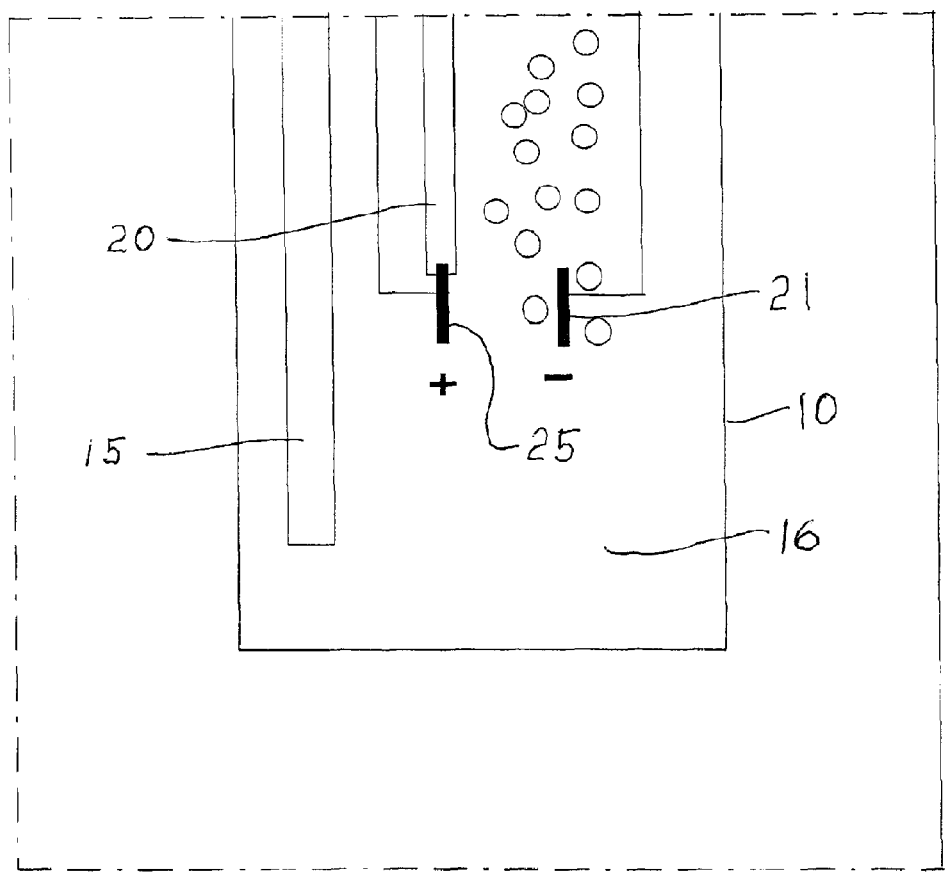
FIG. 3 is an enlargement of Cutout A of the schematic drawing of FIG. 2.
Figure 4:
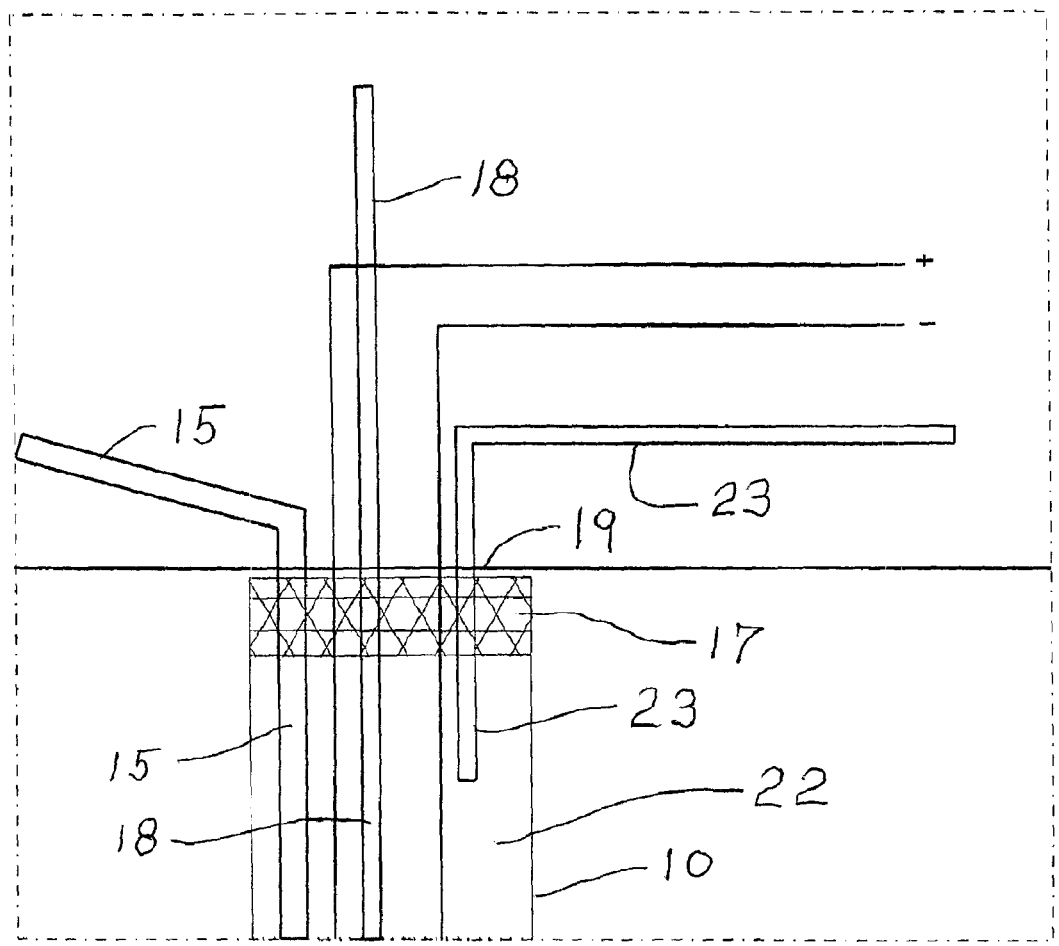
FIG. 4 is an enlarged view of Cutout B of the schematic drawing of FIG. 2.

FIG. 2 schematically illustrates a basic embodiment of the system of the present invention wherein a deep sealed production chamber 10 is illustrated which can withstand high pressures of 500 psi or more is constructed in the earth. A water feed pipe 15 extends from the source of water source 11 under hydrostatic pressure and flows by gravity to the bottom of production chamber 10. The elevation difference between the bottom of production chamber 10 and the water source 11 creates the high pressure within the water 16 supplied to the bottom of production chamber 10.

Production chamber 10 may be provided by a bore hole within the earth or it may be provided also, for example, by an existing mine shaft. The upper end of production chamber 10 is sealed off by top seal 17 such that production chamber 10 will maintain produced hydrogen and oxygen gases within the production chamber under high pressure created by the water pressure of the water 16 contained in the bottom portion of the production chamber 10.

An oxygen escape pipe 18 extends from the exterior 19 of production chamber 10 to the bottom of production chamber 10 as indicated at 20 for exhausting produced oxygen under pressure from the bottom of the production chamber 10.

An electrolyzing device is positioned at the bottom of the production chamber 10 for producing hydrogen and oxygen gas under pressure. Oxygen escape pipe 18 is provided with the positive anode electrode 25 of the electrolyzing device therein at the bottom 20 of the oxygen escape pipe for generating oxygen within the pipe with the electrolyzing device. The negative cathode 21 of the electrolyzing device is provided for generating hydrogen under pressure at the bottom of production chamber 10. The hydrogen bubbles upwardly as it is generated and is stored in the upper storage area 22 of production chamber 10. The pressure of the accumulating hydrogen gas in area 22 will increase and water will begin to be pushed up water pipe 15 and out of the production chamber 10. As the stored hydrogen gas in the upper storage area 22 is removed, the water will flow from the water source 11 through water pipe 15, back into the production chamber 10. This will keep the hydrogen gas under pressure in the upper storage area 22 as the hydrogen gas is withdrawn.

Oxygen generated within the bottom of oxygen escape pipe 18 escapes under pressure to the top end of oxygen escape pipe 18 to atmosphere or may be directed to a storage facility for storage under pressure for later use.

Hydrogen under pressure within the upper storage area 22 of production chamber 10 may be transported under its own pressure through feed pipe 23 to another storage facility or transported to a power house or to other applications for combustion.

Production chamber 10 is maintained at a sufficient depth of at least 100 feet in order to provide adequate head pressure from water source 11 within the bottom of production chamber 10 at 16. Deep abandoned mine shafts of 1,000 feet or more may be utilized for this purpose.

Figure 5:
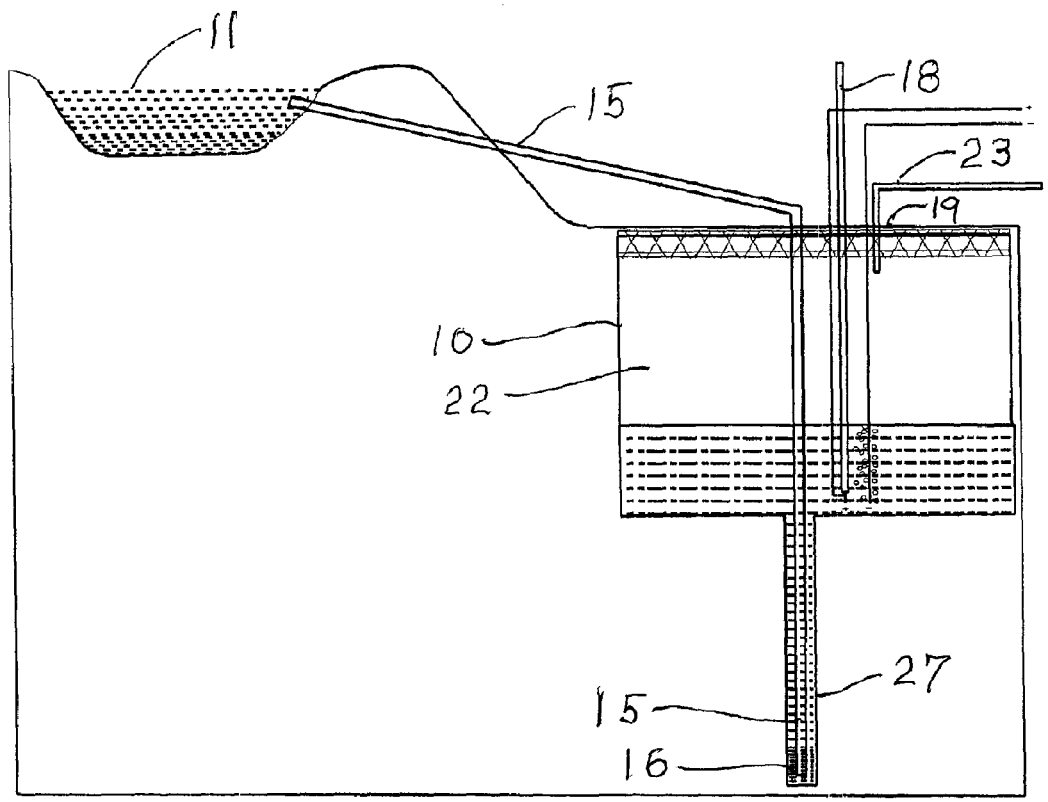
FIG. 5 is a schematic drawing illustrating another embodiment of the system of the present invention showing the use of a shallower underground production chamber utilized in conjunction with a deeper bore hole provided to increase the pressure in the production chamber.

Referring next to FIG. 5, an alternate embodiment of underground production chamber 10 is illustrated wherein a deep bore hole 27, similar to an oil or gas well, is drilled through the bottom of the underground production chamber 10 and extends a considerable depth thereunder as illustrated, and the water feed pipe 15 extends to the bottom of this bore hole 27. Accordingly, the pressure of the hydrogen gas in the storage area 22 of the production chamber 10 will then be equal to the water pressure at the bottom of water pipe 15. This embodiment accordingly provides a production chamber which maintains adequate pressure of the hydrogen and oxygen gases produced, but does not require the production chamber 10 to extend downwardly to great depths, thereby reducing production costs for building the system of the present invention.

Figure 6:
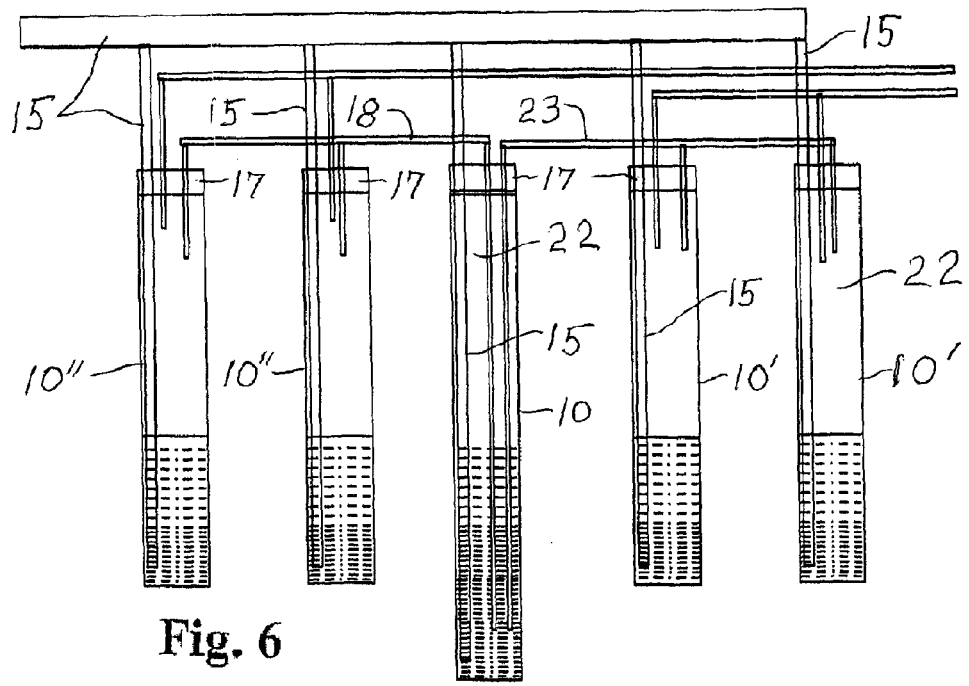
FIG. 6 is a schematic drawing illustrating one production chamber constructed in accordance with the teachings of the present invention which is shown in combination with multiple additional storage chambers for storing pressurized oxygen and hydrogen generated in the production chamber.

FIG. 6 schematically illustrates a centrally located production chamber 10 of the present invention in combination with adjacent hydrogen storage chambers 10' and oxygen storage chambers 10" for respectively storing the hydrogen and oxygen under pressure which was produced and originated from production chamber 10. Water from the water source as before is piped into the production chamber 10 and storage chambers 10' and 10" whereby the water can flow freely into the chambers and back out of the chambers when the pressurized gases push the water out of the respective chambers. The oxygen produced by the electrolysis in the production chamber 10 is piped into multiple storage chambers 10" designed solely for the storage of the oxygen gas under pressure, and the hydrogen produced by the electrolysis in the production chamber 10 is piped into multiple storage chambers 10' designed solely for the storage of the hydrogen gas under pressure.

Due to the water feed to the bottom of the storage chambers 10' and 10", the high pressures of the stored oxygen and hydrogen gases will remain constant in the storage chambers 10' and 10". The pressurized gases will be removed as needed and the constant pressure can be used to transport the gases to an electrical power plant or to distant storage facilities to be used for another purpose, such as hydrogen powered vehicles.

Figure 7:
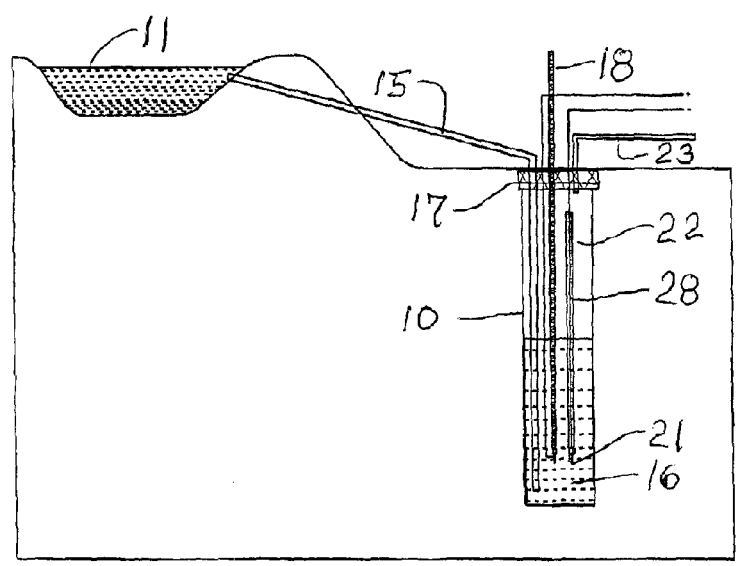
FIG. 7 is a schematic drawing illustrating an additional embodiment of the system of the present invention showing the addition of a hydrogen pipe installed within the production chamber to transfer hydrogen bubbles from the electrolysis electrode to upper portions in the storage area of the production chamber.

FIG. 7 schematically illustrates another embodiment of the system of the present invention wherein a hydrogen pipe 28 is installed within sealed production chamber 10 and the negative cathode electrode 21 of the electrolyzing device is positioned in the bottom of pipe 28 whereby the hydrogen generated within the pressurized water is captured within pipe 28 and transported to the upper storage chamber area 22. This installation minimizes the distance the hydrogen bubbles must travel through water, thereby minimizing additional reaction of the generated hydrogen with the water through which it would otherwise pass.

Figure 8:
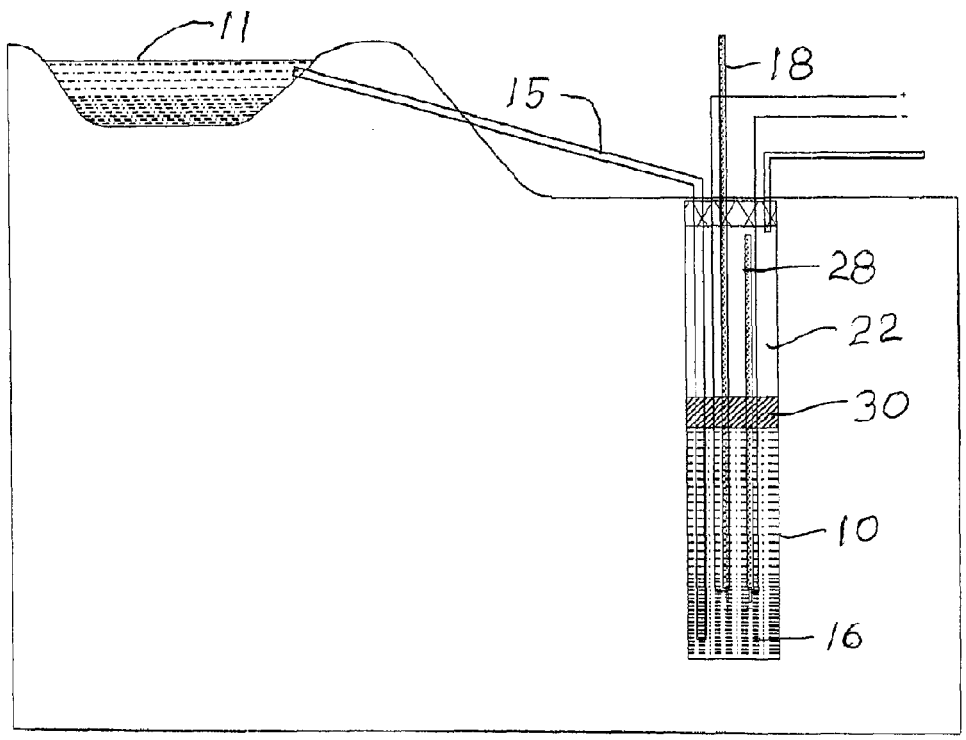
FIG. 8 is a schematic drawing of yet another embodiment of the system of the present invention incorporating a liquid/gas floating seal intermediate the upper hydrogen gas storage area and the lower water containment area of the production chamber of the present invention.

FIG. 8 illustrates an additional embodiment of the present invention wherein a liquid/gas seal 30 is provided within production chamber 10 between the upper storage area 22 for the hydrogen and the lower portion 16 containing water under pressure. This is a floating seal 30 which separates the pressurized hydrogen gas in the storage area 22 from the water in the lower section 16 of the production chamber 10. This floating liquid/gas seal will fall and rise with the water level as more hydrogen is either accumulated or taken out of production chamber 10. This construction minimizes the reaction between the generated hydrogen gas and the water within the production chamber 10.

Figure 9:
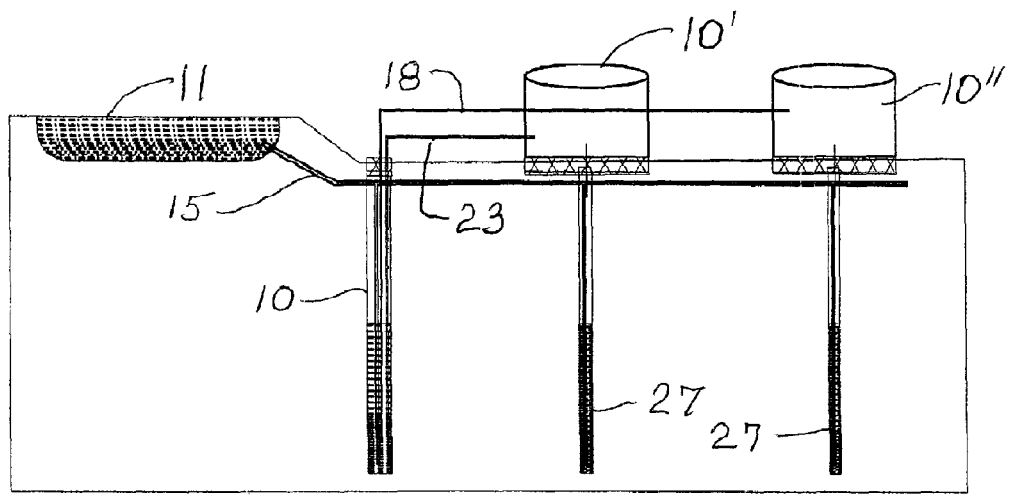
FIG. 9 is a schematic drawing illustrating another embodiment of the system of the present invention wherein multiple above ground storage chambers are utilized to respectively store hydrogen and oxygen gas under pressure from the production chamber, and wherein the storage chambers are maintained under pressure by the addition of deeper bore holes provided under the storage chambers for retaining water therein under pressure from the water source in order to maintain the stored gases under high pressure.

FIG. 9 schematically illustrates another embodiment of the system of the present invention which shows the use of two storage chambers 10' and 11" for storage of hydrogen and oxygen gas respectively under pressure which are similar in construction to the below ground embodiment illustrated in FIG. 5, the difference being that the storage chambers 10' and 10" illustrated in FIG. 9 are above ground storage chambers. Storage chambers 10' and 10" nevertheless in the manner as previously taught, store hydrogen and oxygen respectively under high pressure in view of the deep bore holes 27 provided under the storage chambers 10' and 10" and connected thereto, which bore holes 27 are supplied by water under pressure in order to maintain high pressure within the storage chambers 10' and 10".

I claim:

1. A method of manufacturing, storing and transporting hydrogen and oxygen gas, comprising:

feeding water under hydrostatic pressure from a body of water by gravity down through a pipe to the interior bottom of a deep sealed production chamber, which is rigid and noncollapsible;

producing hydrogen and oxygen gas in and under the applied pressure of said water at the bottom of said production chamber with electrolysis, capturing the produced oxygen gas in an oxygen escape pipe extending from the bottom of said production chamber to exterior of said production chamber, said oxygen gas escape pipe containing a positive anode electrode for the electrolysis in a bottom end of said oxygen pipe, storing the produced hydrogen gas under pressure above said water under hydrostatic pressure in said sealed production chamber by directly contacting said hydrogen gas thereunder with said water under hydrostatic pressure from said body of water;

periodicallly releasing said stored hydrogen gas in said production chamber for transportation under said hydrostatic pressure while sustaining a pressurized state of the hydrogen gas during expulsion of stored gas volume from said production chamber by continuously applying the hydrostatic pressure of replenished water from said body of water to the stored hydrogen gas volume, thereby enabling such gas to be transported or restored in a pressurized state without the need for further energy consumption to compress the hydrogen gas.

2. The method of claim 1, including also capturing and storing said produced oxygen gas under pressure in a sealed container by directly contacting said oxygen gas thereunder with said water under hydrostatic pressure from said body of water.

3. The method of claim 1, including providing a floating seal on said water in said production chamber for thereby segregating said stored hydrogen gas from said water thereunder.

4. The method of claim 1, providing said production chamber from an underground pit.

5. The method of claim 1 wherein said water is fed into said production chamber from the bottom portion of a body of water.

6. The method of claim 1, wherein said electrolysis is energized by electricity generated from solar panels or wind mill generators.

7. The method of claim 6, wherein said produced hydrogen and oxygen are burned at selected times for generating electricity.

8. The method of claim 1, wherein said high pressure of said production chamber is in excess of 500 psi.

9. The method of claim 1, wherein th depth of said production chamber is in excess of 100 feet.

* * * * *